(12) United States Patent
Wen et al.

(10) Patent No.: US 7,153,139 B2
(45) Date of Patent: Dec. 26, 2006

(54) LANGUAGE LEARNING SYSTEM AND METHOD WITH A VISUALIZED PRONUNCIATION SUGGESTION

(75) Inventors: Sayling Wen, Taipei (TW); Zechary Chang, Taipei (TW); Pinky Ma, Beijing (CN)

(73) Assignee: Inventec Corporation, Taipei (TW)

( * ) Notice: Subject to any disclaimer, the term of this patent is extended or adjusted under 35 U.S.C. 154(b) by 672 days.

(21) Appl. No.: 10/372,828

(22) Filed: Feb. 26, 2003

(65) Prior Publication Data

US 2004/0166480 A1   Aug. 26, 2004

(51) Int. Cl.
G09B 19/00   (2006.01)
(52) U.S. Cl. .................. 434/156; 434/169; 434/185; 434/307 R; 434/362; 704/1; 704/200
(58) Field of Classification Search ............... 434/156, 434/157, 167, 169, 185, 307 R, 308, 362, 434/365; 704/1, 200, 252, 254, 270, 271, 704/276, 277; 381/103
See application file for complete search history.

(56) References Cited

U.S. PATENT DOCUMENTS

| | | | | |
|---|---|---|---|---|
| 4,969,194 A * | 11/1990 | Ezawa et al. | ............... | 704/276 |
| 5,142,657 A * | 8/1992 | Ezawa et al. | ............... | 704/276 |
| 5,741,136 A * | 4/1998 | Kirksey et al. | ............. | 434/169 |
| 5,884,263 A * | 3/1999 | Aaron et al. | ................ | 704/270 |
| 5,938,447 A * | 8/1999 | Kirksey | ....................... | 434/169 |
| 6,109,923 A * | 8/2000 | Rothenberg | ................. | 434/185 |
| 6,249,763 B1 * | 6/2001 | Minematsu | .................. | 704/252 |
| 6,336,089 B1 * | 1/2002 | Everding | ........................ | 704/1 |
| 6,714,911 B1 * | 3/2004 | Waryas et al. | ............. | 704/271 |
| 2002/0118846 A1 * | 8/2002 | Narusawa | .................... | 381/103 |
| 2002/0160341 A1 * | 10/2002 | Yamada et al. | ............. | 434/157 |
| 2003/0225580 A1 * | 12/2003 | Lin | ............................ | 704/254 |
| 2004/0006461 A1 * | 1/2004 | Gupta et al. | ................ | 704/200 |
| 2004/0152055 A1 * | 8/2004 | Gliessner et al. | ........... | 434/169 |
| 2004/0176960 A1 * | 9/2004 | Shpiro et al. | ............... | 704/277 |

\* cited by examiner

Primary Examiner—Joe H. Cheng
(74) Attorney, Agent, or Firm—Birch, Stewart, Kolasch, and Birch, LLP

(57) ABSTRACT

A language learning system and method with a visualized pronunciation suggestion is disclosed. A sound wave corresponding to a sample voice output is used to suggest the user to make corrections with respect to tones and stresses. Through sectional evaluations and corrections, the invention can effectively improve the speaking ability of the user. The disclosed system includes a language database, a follow-reading module, a display control module, a sectional evaluation module, a correction module, and a suggestion-editing module. The disclosed method includes the steps of: extracting a full-sentence sample, outputting a full-sentence voice message and an associated message, prompting the user to imitate and recording the voice data, comparing the voice data with the full-sentence voice message and outputting the similarity, and evaluating the voice data.

7 Claims, 6 Drawing Sheets

LANGUAGE LEARNING SYSTEM AND METHOD WITH A VISUALIZED PRONUNCIATION SUGGESTION

BACKGROUND OF THE INVENTION

1. Field of Invention

The invention relates to a language learning system and method. In particular, the invention relates to a language learning system and method utilizing a visualized pronunciation suggestion.

2. Related Art

As travel becomes much easier nowadays, there are more chances for people from different countries to communicate. Therefore, the language ability will be an emphasized subject in the future education.

Under the system of normal schools and cram schools, the language learning is usually performed by having one or several teachers to stimulate learners' interests through various kinds of activities and interactions. In this case, the number of students is often much more than that of teachers. Therefore, it is very hard to closely follow and monitor the pronunciation of each learner. Moreover, the pronunciation of the teacher may not be standard, which will greatly affect the students' learning too.

With the advance in computer technology, there are many language learning devices or packages that use the computer as an aided tool. Even with the combination with multimedia, real-person pronunciation optical disks and various kinds of interactive learning software are still limited to imitation of sentences and adjustment of the voice playing speed. These are all one-directional teaching and learning. The learner can only partially know the problems in his or her pronunciation. If so, even after having got acquainted with many foreign language expressions and received good listening comprehension training, the learner may be still unable to pronounce in a way similar to a native speaker when communicating with other people. This is indeed a serious problem in the learning of pronunciation.

The sound wave diagram is a diagram that visualizes computer quantified sound waves. The waves can clearly indicate the tones and stresses in voices. It is mostly used in voice information engineering. Recording engineers can accurately find the deviation of any sound characters in order to correct the tiny wave differences and achieve a higher recording quality. However, there is no language learning system and method that utilizes this technique to date.

SUMMARY OF THE INVENTION

In view of the foregoing, the invention provides a language learning system and method which utilize a visualized pronunciation suggestion means. An objective of the invention is to use a sound wave diagram corresponding to voice output of sentence samples to suggest the user how to adjust the tones and stresses when speaking. Through sectional evaluations and corrections, the user's speaking ability can be effectively enhanced.

To achieve the above objective, the disclosed language learning system includes: a language database, a follow-reading module, a display control module, a sectional evaluation module, a correction module, and a suggestion-editing module.

The disclosed language learning method includes the steps of: extracting a full-sentence language sample, outputting a full-sentence voice message and an associated message, prompting the user to imitate and recording the voice data, comparing the voice data with the full-sentence voice message and outputting the similarity, and evaluating the voice data.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE INVENTION

The invention pertains to a language learning system and method that utilizes a visualized pronunciation suggestion means.

Figure 1:
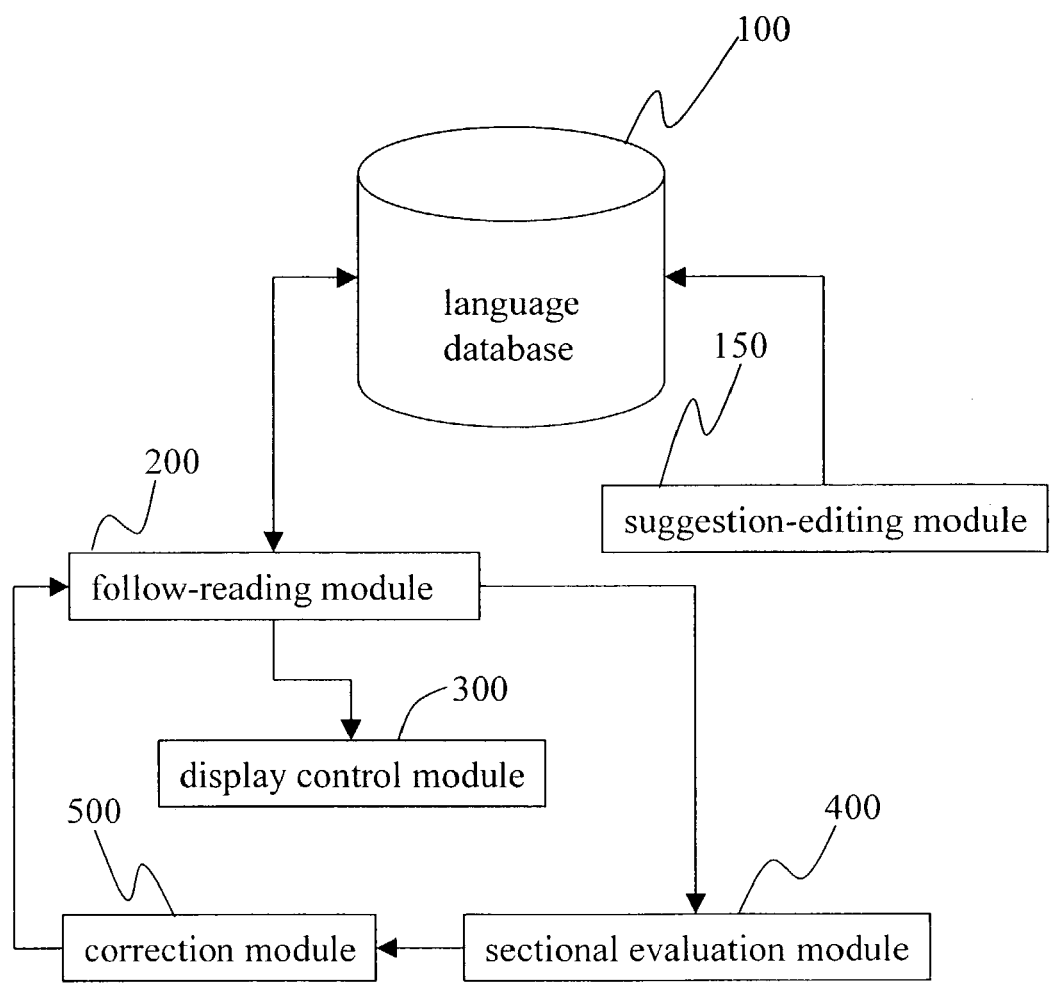
FIG. 1 is a schematic view of the disclosed language learning system using a visualized pronunciation suggestion means.

In the following text, we use an embodiment shown in FIG. 1 to illustrate the feasibility of the invention.

(1) The language database 100 stores language samples. The language sample contains a voice message and an associated message. The voice message refers to the voice output of a language sample content. The associated message refers to the sound wave diagram and text hints that are played synchronously with the voice message.

(2) The follow-reading module 200 extracts a language sample from the language database 100 and outputs a voice message. After prompting the user to imitate the the pronunciation, it further records the voice data of the user.

(3) The display control module 300 outputs the associated message extracted by the follow-reading module 200. After recording the voice message of the user, it also output the corresponding sound wave diagram. The associated message refers to the sound wave diagram and text tags corresponding to the voice message. Through the presentation on the screen, the user is able to comprehend the voice data of part of or the whole sentence. The sound wave diagram is drawn according to the tones, stresses, and punctuation of a real-person voice. The user can generate the sound wave diagram of his or he own in the system. This is helpful in discovering problems in tones and stresses that are usually hard to detect. Therefore, the invention can effectively enhance the user's pronunciation accuracy.

(4) The sectional evaluation module 400 uses the voice message as the standard and compares it with the voice data recorded from the user. The computer calculate a difference between the voice message and the user's voice data, providing a similarity value, which can be a percentage value. It shows the difference between the voice data and the voice message. The similarity of the full sentence is displayed for the user to correct his or her pronunciation. In particular, the similarity of the full sentence is the average of those for individual sections. Therefore, even if the evaluation of the full sentence is satisfactory (i.e. the similarity is above 80%), there might be some unsatisfactory sections (e.g. the similarity of a particular section is blow 80%).

(5) The correction module 500 determines the execution of repeating the follow-reading job according to the pronunciation similarity. In other words, the similarities of the full sentence and individual sections are used to determine whether the voice message should be played again and whether the user's voice should be recorded in order to enhance the user's pronunciation accuracy.

The disclosed system further contains a suggestion-editing module 150. Before the follow-reading module extracts a language sample, it cuts and tags the voice message and the associated message. That is, it can divides according to the user's settings a full sentence into individual sections comprised of only a single word or a few words, so that sectional language samples can be provided for the user to practice.

Figure 2:
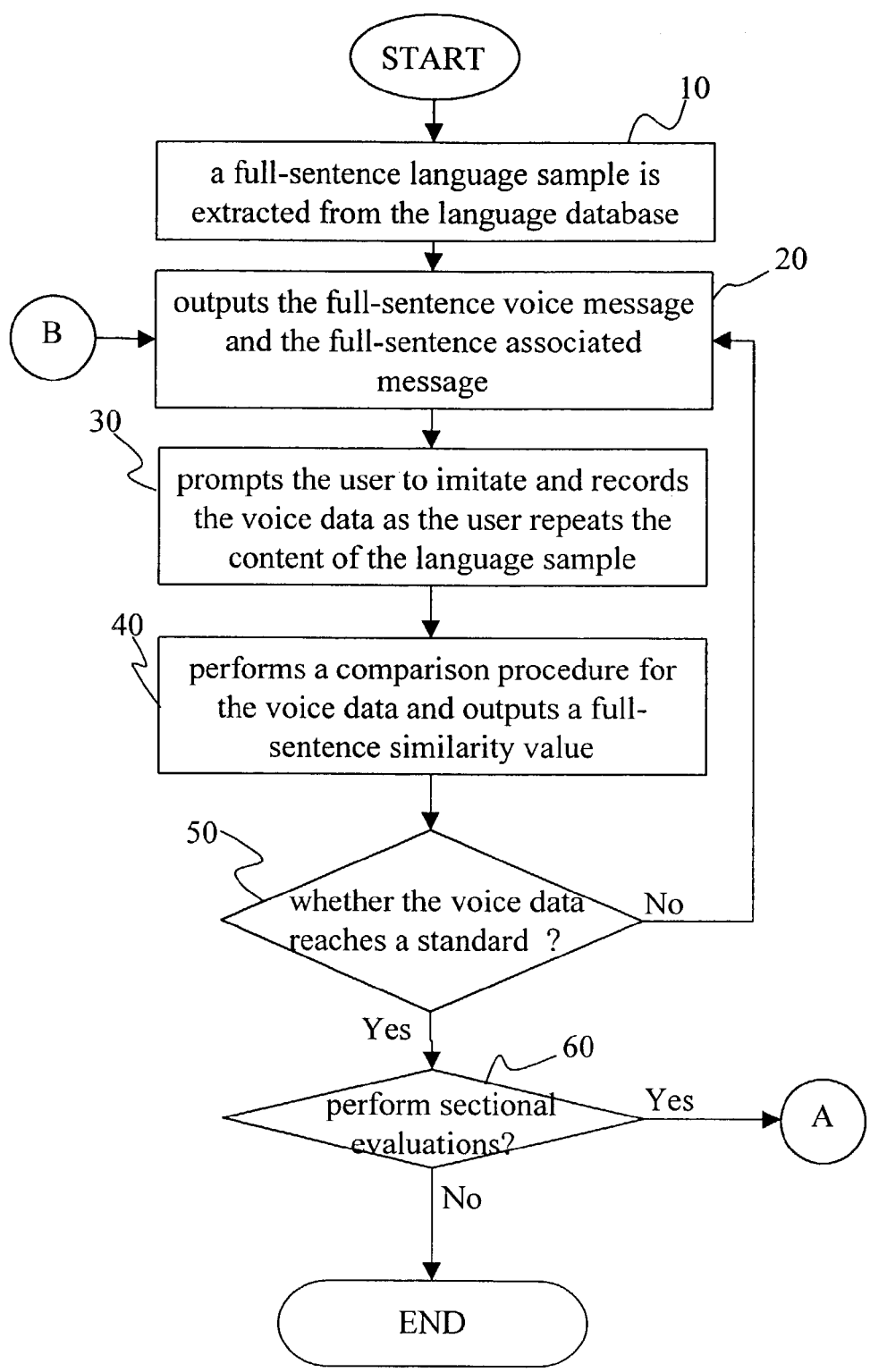
FIG. 2 is a schematic view of the disclosed language learning method using a visualized pronunciation suggestion means.
Figure 4:
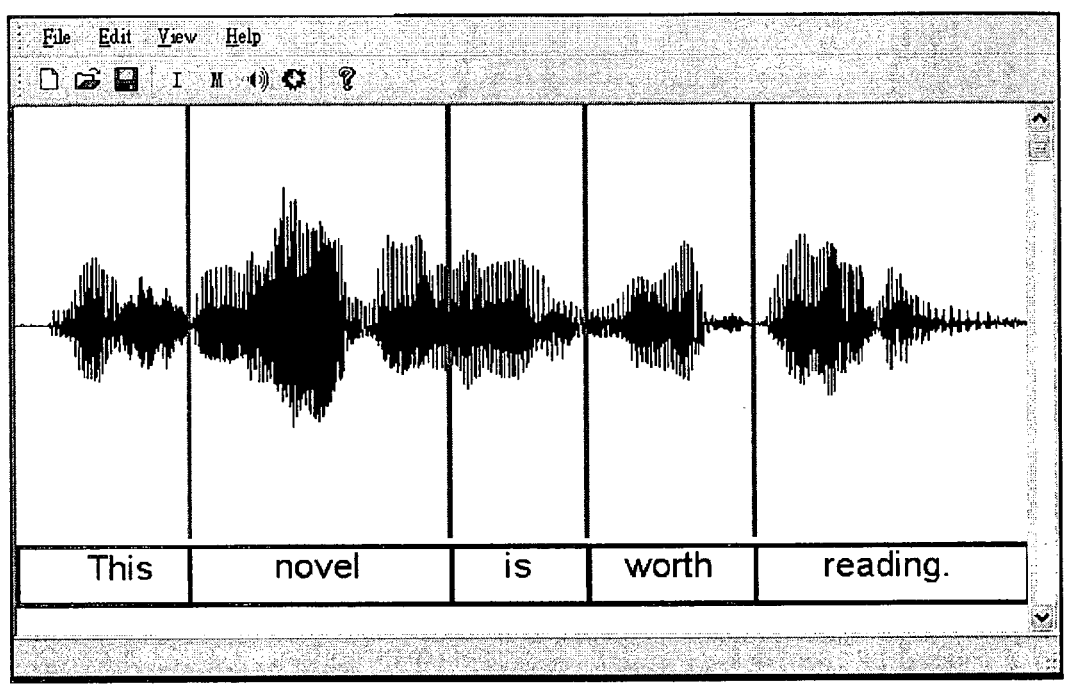
FIG. 4 is a schematic view of the full-sentence associated message synchronously played with the voice message according to the invention.
Figure 5:
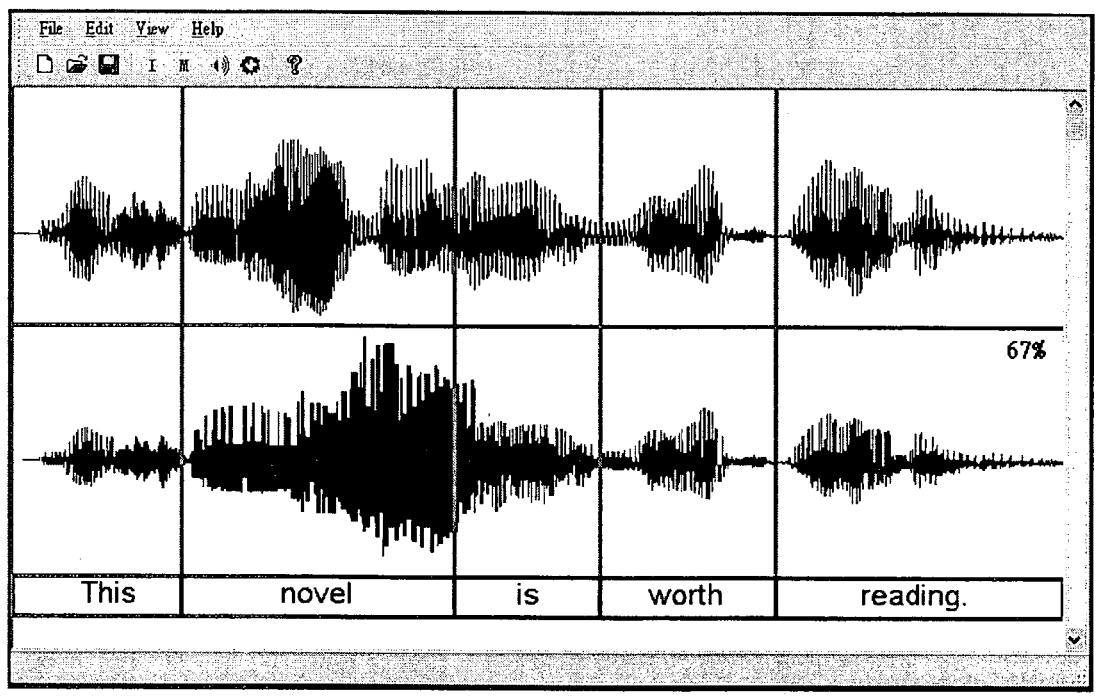
FIG. 5 is a schematic view of the full-sentence similarity output by the disclosed system.

With reference to FIG. 2, the disclosed method uses a sound wave diagram in the language sample to suggest the user how to correctly pronounce the sentence. The method contains the following steps. First, a full-sentence language sample is extracted from the language database 100 (step 10). The follow-reading module 200 outputs the full-sentence voice message and the display control module 300 outputs the full-sentence associated message (step 20). The user can thereby comprehend the content of the voice message (see FIG. 4). The follow-reading module 200 prompts the user to imitate and records the voice data as the user repeats the content of the language sample (step 30). The sectional evaluation module 400 performs a comparison procedure for the voice data and outputs a full-sentence similarity value in step 40 (see FIG. 5). Finally, the system determines whether the voice data reaches a standard (step 50). Suppose the system has a default voice similarity value of 80%. If the full-sentence similarity is 67%, then the correction module 500 determines that the voice data is not satisfactory. The system communicates with the follow-reading module 200, notifying the follow-reading module 200 and the display control module 300 to output the full-sentence voice message and the full-sentence associated message (i.e., step 20). At the same time, the user can observe his or her own sound wave diagram and find the difference in tones and stresses from the sound wave diagram of the language sample, so that the user can correct the pronunciation in the next practice. The following steps are performed in order until the full-sentence similarity exceeds 80%. The user can also choose to perform sectional evaluations (step 60) to strengthen the speaking accuracy.

Figure 3:
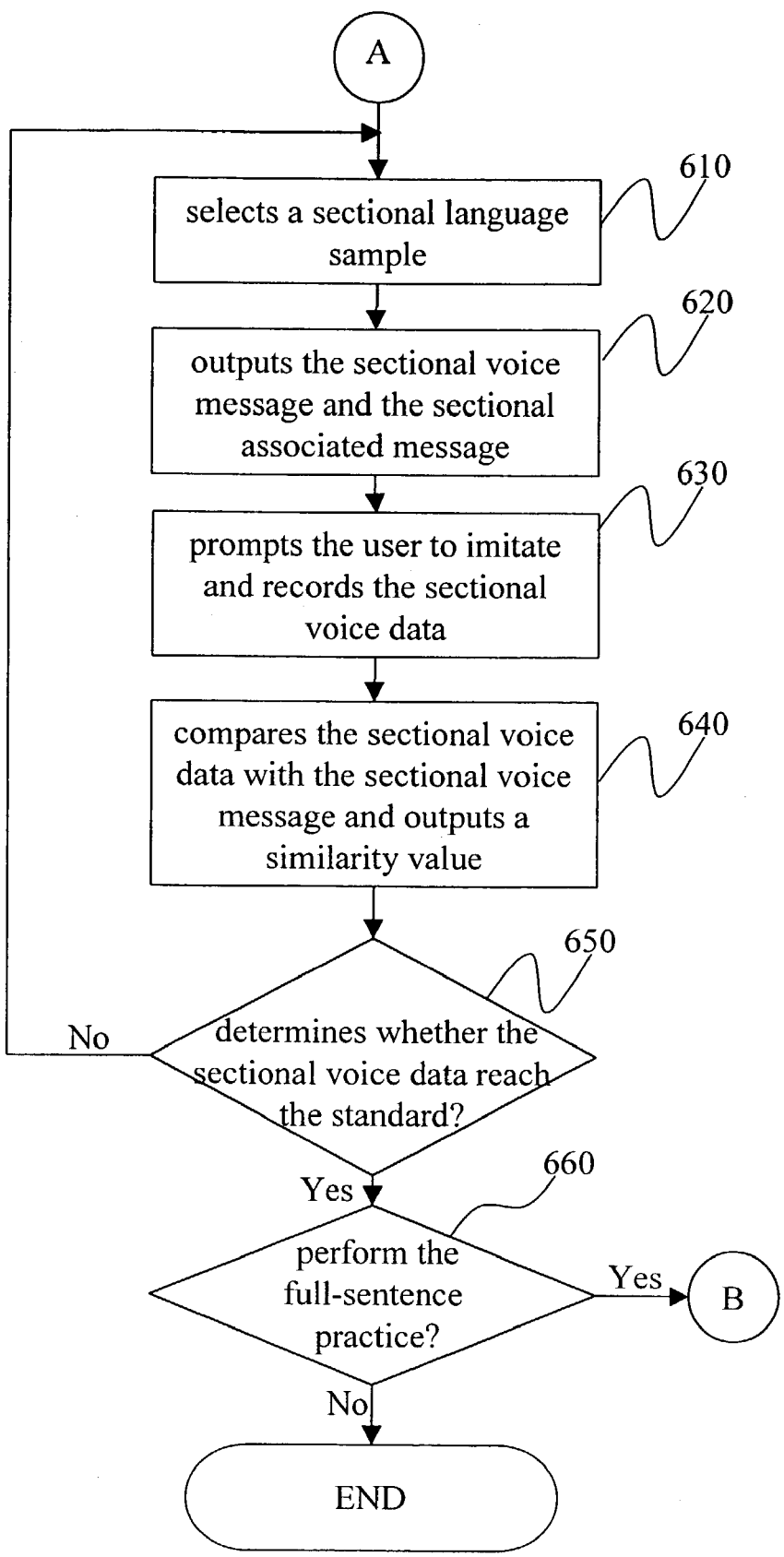
FIG. 3 is a flowchart of the sectional follow-reading practice of the invention.
Figure 6:
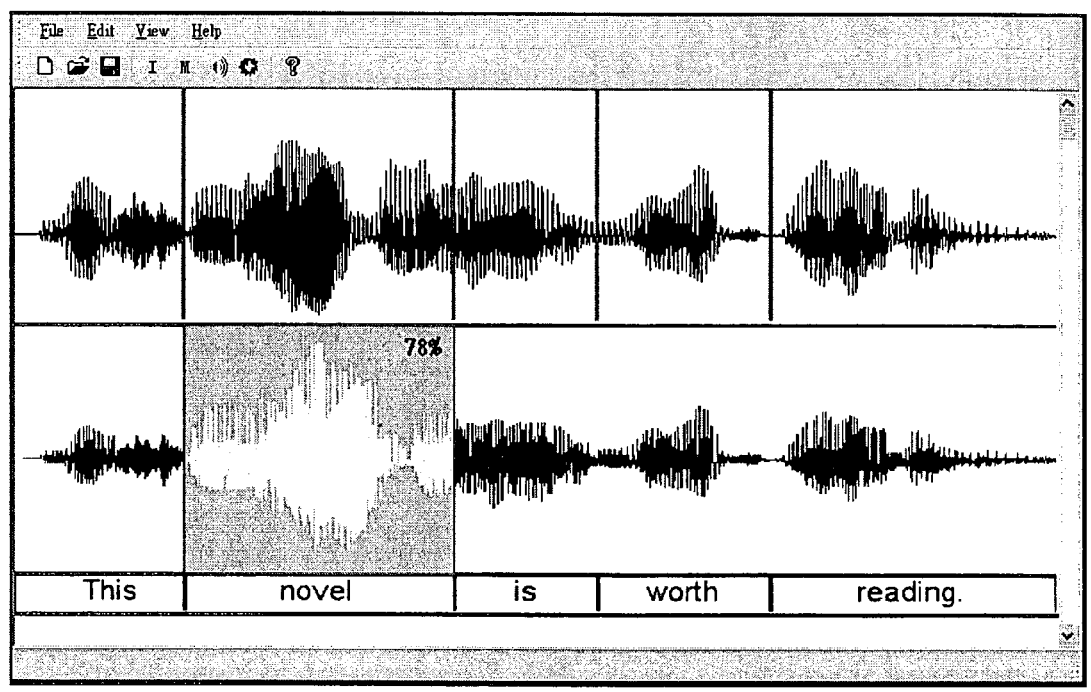
FIG. 6 is a schematic view of the similarity output from the comparison procedure for sectional voice data according to the invention.

In the procedure of the method, besides the full-sentence voice playing and follow-reading practice it further contains sectional practices. Using the suggestion-editing module 150 of the system, the user can cuts and tags the voice message and the associated message at one's will (see FIG. 4). Afterwards, sectional voice messages and sectional associated messages are generated. Please refer to FIG. 3. The user first selects a sectional language sample (step 610). The follow-reading module 200 outputs the sectional voice message and the sectional associated message (step 620). The follow-reading module 200 further prompts the user to imitate and records the sectional voice data (step 630). The system then compares the sectional voice data with the sectional voice message and outputs a similarity value in step 640 (see FIG. 6). The similarity value indicates the similarity of the sectional voice message and the sound wave produced by the user. Step 650 determines whether the sectional voice data reach the standard. If the similarity of the sectional voice data is only 78% (the standard is predetermined to be 80%), then the correction module 500 communicates with the follow-reading module 200 to repeat the current sectional evaluation steps until the similarity is satisfactory. Afterwards, the user can decide whether to perform the full-sentence practice (step 660) or to simply end the sectional follow-reading practice.

EFFECTS OF THE INVENTION

The disclosed language learning system and method using a visualized pronunciation suggestion means can visually present the pronunciation tones and stresses in terms of sound wave diagrams. The user can observe the difference between his or her own pronunciation and the language sample in an objective way, thereby effectively correcting and improving the pronunciation.

Certain variations would be apparent to those skilled in the art, which variations are considered within the spirit and scope of the claimed invention.

What is claimed is:

1. A language learning system using a visualized pronunciation suggestion means to output a sound wave diagram being drawn according to the tones, stresses, and punctuation of a real-person voice for the user to imitate and to suggest to the user how to adjust the tones and stresses when speak-practicing according to sectional evaluation results, the system comprising:

a language database, which stores the language sample, each of the language samples having a voice message and an associated message;

a follow-reading module, which extracts the language sample from the language database, outputs the language message and records a voice data from the user;

a display control module, which outputs an associated message in the language sample extracted by the follow-reading module and outputs the sound wave diagram associated with the voice message after recording the voice data wherein, through a presentation of the sound wave diagram on a screen, the user is able to comprehend the voice data of part of or the whole sentence;

a sectional evaluation module, which uses the voice message as a standard to perform a comparison procedure on the voice data and outputs a full-sentence similarity for the user to make corrections in the pronunciation; and a correction module, which determines whether a follow-reading task should be repeated according to the similarity.

2. The system of claim 1, wherein the language sample contains a full-sentence language sample and a plurality of sectional language samples.

3. The system of claim 1, further comprising a suggestion editing module, which performs a cutting and tagging procedure on the voice message and the associated message before the follow-reading module extracts the language sample.

4. A language learning method using a visualized pronunciation suggestion means to output a sound wave diagram being drawn according to the tones, stresses, and punctuation of a real-person voice for the user to imitate and to suggest to the user how to adjust the tones and stresses when speak-practicing according to sectional evaluation results, and corresponding to the content of a language sample to suggest to the user to make pronunciation corrections, the method comprising the steps of:

extracting a full-sentence language sample;

outputting a full-sentence voice message and a full-sentence associated message wherein through a presentation of the sound wave diagram on a screen, the user is able to comprehend the voice data of part of or the whole sentence;

prompting the user to imitate and recording voice data from the user;

performing a comparison procedure on the voice data and outputting a full-sentence similarity; and evaluating whether the voice data reaches a standard.

5. The method of claim 4, wherein, when the voice data does not reach the standard, the following steps are repeated:

outputting a full-sentence voice message and a full-sentence associated message;

prompting the user to imitate and recording voice data from the user;

performing a comparison procedure on the voice data and outputting a full-sentence similarity; and evaluating whether the voice data reaches a standard.

6. The method of claim 4, wherein, after the voice data is evaluated to exceed to standard, the method further contains a sectional evaluation step for performing pronunciation practices on individual sections in the full-sentence language sample, the sectional evaluation step comprising the steps of:

selecting a sectional language sample; outputting a sectional language message and a sectional associated message;

prompting the user to imitate and recording sectional voice data from the user;

performing a comparison procedure on the sectional voice data and outputting a similarity; and evaluating whether the sectional voice data reaches a standard.

7. The method of claim 6, wherein, when the voice data does not reach the standard, the following steps are repeated:

outputting a sectional language message and a sectional associated message;

prompting the user to imitate and recording sectional voice data from the user;

performing a comparison procedure on the sectional voice data and outputting a similarity; and evaluating whether the sectional voice data reaches a standard.

* * * * *